US010995644B2

(12) United States Patent
 Fey (10) Patent No.: US 10,995,644 B2
(45) Date of Patent: May 4, 2021

(54) METHOD FOR DISTINGUISHING BETWEEN MODEL INACCURACIES AND LAMBDA OFFSETS FOR A MODEL-BASED CONTROL OF THE FILL LEVEL OF A CATALYTIC CONVERTER

(71) Applicant: Robert Bosch GmbH, Stuttgart (DE)

(72) Inventor: Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/722,787

(22) Filed: Dec. 20, 2019

(65) Prior Publication Data
 US 2020/0208559 A1     Jul. 2, 2020

(30) Foreign Application Priority Data

Dec. 27, 2018  (DE) .......................... 102018251726.6
Feb. 1, 2019   (DE) .......................... 102019201293.0

(51) Int. Cl.
 *F01N 3/10*   (2006.01)
 *F01N 3/20*   (2006.01)
 *F01N 9/00*   (2006.01)
 *B01D 53/94*  (2006.01)

(52) U.S. Cl.
 CPC ........... *F01N 9/00* (2013.01); *B01D 53/9454* (2013.01); *B01D 53/9495* (2013.01); *F01N 3/101* (2013.01); *F01N 3/20* (2013.01); *F01N 2900/0402* (2013.01); *F01N 2900/08* (2013.01);
 (Continued)

(58) Field of Classification Search
 CPC ... F01N 3/101; F01N 3/20; F01N 9/00; F01N 9/005; F01N 2560/025; F01N 2900/1624; F01N 2900/08; F01N 2900/1402; F01N 2900/0402; B01D 53/9454;
 (Continued)

(56) References Cited

U.S. PATENT DOCUMENTS

2006/0090454 A1*  5/2006  Odendall ............ F02D 41/0275
                                                  60/274
2011/0192149 A1*  8/2011  Yasui ..................... F01N 11/00
                                                  60/287
(Continued)

FOREIGN PATENT DOCUMENTS

DE              19606652 A1    8/1997

*Primary Examiner* — Audrey K Bradley
*Assistant Examiner* — Dapinder Singh
(74) *Attorney, Agent, or Firm* — Norton Rose Fulbright US LLP; Gerard Messina (57) ABSTRACT

A method for controlling a fill level of an exhaust gas component store of a catalytic converter of an internal combustion engine, in which the fill level is controlled by using a system model, which includes a catalytic converter model, and uncertainties of measurement or model variables, which influence the control of the fill level, being corrected by an adaptation that is based on signals of an exhaust-gas probe situated on the output side of the catalytic converter. The method provides that an adaptation requirement is learned as a function of the operating point, the learned adaptation requirement is stored as a function of the operating point, and a distinction is made based on the operating point dependency between different causes of the uncertainties. Also described is a control unit to carry out the method.

20 Claims, 5 Drawing Sheets

(52) U.S. Cl.
    CPC .............. *F01N 2900/1402* (2013.01); *F01N 2900/1624* (2013.01)

(58) Field of Classification Search
    CPC ............ B01D 53/9495; F02D 41/1475; F02D 41/1445; F02D 41/1454; F02D 41/0925; F02D 2041/1433
    USPC .......................... 60/274, 277, 286, 295, 299
    See application file for complete search history.

(56) References Cited

U.S. PATENT DOCUMENTS

| | | | | |
|---|---|---|---|---|
| 2011/0265454 | A1* | 11/2011 | Smith | F01N 3/0842 60/274 |
| 2011/0265771 | A1* | 11/2011 | Banker | F02D 41/0087 123/564 |
| 2013/0199161 | A1* | 8/2013 | Aisaka | F02D 41/2477 60/276 |
| 2013/0226439 | A1* | 8/2013 | Hashemi | F02N 11/04 701/112 |

* cited by examiner

METHOD FOR DISTINGUISHING BETWEEN MODEL INACCURACIES AND LAMBDA OFFSETS FOR A MODEL-BASED CONTROL OF THE FILL LEVEL OF A CATALYTIC CONVERTER

RELATED APPLICATION INFORMATION

The present application claims priority to and the benefit of German patent application no. 10 2018 251 726.6, which was filed in Germany on Dec. 27, 2018, the disclosure which is incorporated herein by reference.

FIELD OF THE INVENTION

The present invention relates to a method for controlling a fill level of an exhaust gas component store of a catalytic converter in the exhaust gas of an internal combustion engine. In its device aspects, the present invention relates to a control unit.

BACKGROUND INFORMATION

Such a method and such a control unit are respectively discussed in the applicant's DE 196 06 652 B4 for oxygen as the exhaust gas component.

In the method, the fill level is controlled by using a system model, which includes a catalytic converter model. Uncertainties of measurement or model variables, which influence the control of the fill level, are corrected by an adaptation, which is based on signals of an exhaust-gas probe situated on the output side of the catalytic converter. The control unit is configured to implement such a method.

In the event of an incomplete combustion of the air-fuel mixture in an Otto engine, apart from nitrogen ($N_2$), carbon dioxide ($CO_2$) and water ($H_2O$), a multitude of combustion products are emitted, of which hydrocarbons (HC), carbon monoxide (CO) and nitrogen oxides ($NO_x$) are limited by law. According to the current state of technology, applicable exhaust-gas limit values for motor vehicles can only be maintained using a catalytic exhaust-gas aftertreatment. The use of a three-way catalytic converter makes it possible to convert the mentioned pollutant components.

Using three-way catalytic converters, it is possible to achieve a simultaneously high conversion rate for HC, CO and $NO_x$ only in a narrow lambda range around the stoichiometric operating point (lambda=1), the so-called conversion window.

For operating the three-way catalytic converter within the conversion window, today's engine management systems typically use a lambda control system, which is based on the signals from lambda probes situated upstream and downstream from the three-way catalytic converter. For controlling the air ratio lambda, which is a measure of the composition of the fuel/air ratio of the internal combustion engine, the oxygen content of the exhaust gas is measured upstream from the three-way catalytic converter using an input-side exhaust-gas probe situated in that location. As a function of this measurement value, the control system corrects the fuel quantity, specified by a pilot control function in the form of a base value, or the injection pulse width.

Within the scope of the pilot control process, base values of fuel quantities to be injected are specified as a function of, for example, the rotational speed and the load of the internal combustion engine. For an even more precise control, a further exhaust-gas probe measures the oxygen concentration of the exhaust gas downstream from the three-way catalytic converter.

The signal of this output-side exhaust-gas probe is used for a reference control that is superimposed on the lambda control based on the signal of the input-side exhaust-gas probe upstream from the three-way catalytic converter. Normally, a step-change lambda probe is used as the exhaust-gas probe downstream from the three-way catalytic converter, which at lambda=1 has a very steep characteristic curve and is therefore able to indicate lambda=1 very precisely (Kraftfahrtechnisches Taschenbuch (Automotive Handbook), 23rd edition, page 524).

Apart from reference control, which generally only corrects small deviations from lambda=1 and is comparatively slow, current engine management systems normally have a functionality, which, following large deviations from lambda=1, ensures in the form of a lambda pilot control that the conversion window is reached again quickly, which is important for example following phases of overrun switch-off, in which the three-way catalytic converter is charged with oxygen. The charging with oxygen impairs the $NO_x$ conversion.

Due to the ability of the three-way catalytic converter to store oxygen, it is possible that lambda=1 obtains still for several seconds downstream from the three-way catalytic converter, after a rich or lean lambda was set upstream from the three-way catalytic converter. This property of the three-way catalytic converter of being able to store oxygen temporarily is used to equalize brief deviations from lambda=1 upstream from the three-way catalytic converter. If lambda is unequal to 1 upstream from the three-way catalytic converter for a longer period, the same lambda will also set in downstream from the three-way catalytic converter, as soon as the oxygen fill level at a lambda>1 (excess oxygen) exceeds the oxygen storage capacity or as soon as no more oxygen is stored in the three-way catalytic converter when lambda<1.

At this point in time, a step-change lambda probe downstream from the three-way catalytic converter also indicates that the conversion window has been abandoned. Up until this point in time, the signal of the lambda probe downstream from the three-way catalytic converter, however, gives no indication of the imminent breakthrough, and a reference control based on this signal therefore often reacts so late that the fuel metering system is no longer able to react in time before a breakthrough. Elevated tail pipe emissions occur as a consequence. Current control concepts therefore have the disadvantage that they are late in detecting a departure from the conversion window on the basis of the voltage of the step-change lambda probe downstream from the three-way catalytic converter.

An alternative to control on the basis of the signal of a lambda probe downstream from the three-way catalytic converter is a control of the average oxygen fill level of the three-way catalytic converter. Although this average fill level is not measurable, according to the document DE 196 06 652 B4 mentioned at the outset, it may be modeled by calculations.

A three-way catalytic converter, however, is a complex, nonlinear controlled system having time-variant system parameters. Furthermore, the measured or modeled input variables for a model of the three-way catalytic converter are usually encumbered with uncertainties.

SUMMARY OF THE INVENTION

The present invention has the characterizing features described herein and in its device aspects by the characterizing features as described herein.

The characterizing features as described herein provide for the learning of an adaptation requirement as a function of the operating point, for the learned adaptation requirement to be stored as a function of the operating point, and for a distinction to be made on the basis of the operating point dependence between different causes of the uncertainties. The control unit is configured to implement such a method.

Since the input variables of the system model may be encumbered with uncertainties, and since the system model itself may also be inaccurate (for example because it does not take certain effects into account), deviations may arise between the variables modeled with the aid of the system model (e.g. oxygen fill level of the catalytic converter) and the corresponding real variables. This is the case particularly when there is an offset of the lambda signal upstream from the catalytic converter.

The operating point-dependent learning of the adaptation requirement allows for a differentiation between the causes that result in the adaptation requirement, and thus for a correction that meets the requirement. A model-based control of a fill level of a catalytic converter, by which a departure from the catalytic converter window is detected early and prevented, is thereby improved further. This makes it possible to reduce the emissions further. Stricter legal requirements may be satisfied at lower costs for the catalytic converter. The present invention allows in particular for a distinction between model inaccuracies of a model-based control of the fill level of a catalytic converter and an actually existing lambda offset and thus allows for a more robust diagnosis of errors in the exhaust system as well as a better localization of the cause of error and thus a simplified error search.

An embodiment provides for ascertaining an adaptation requirement using a multi-step method. A multi-step adaptation combines a continuously working, very accurate adaptation of smaller deviations and a discontinuous quick correction of greater deviations.

The continuous adaptation and the discontinuous correction are based on signal values from different signal ranges of the exhaust-gas probe situated in the exhaust-gas flow downstream from the catalytic converter and thus situated on the output side, two fundamentally different items of information being derived from these signal values. This development makes it possible to take into account the varying meaningfulness of the signal values from the different signal ranges in relation to the exhaust-gas composition and in relation to the fill level of the catalytic converter.

In the discontinuous adaptation, a modeled fill level is corrected in accordance with the actual fill level if the voltage of an output-side exhaust-gas probe indicates a breakthrough from rich or lean exhaust gas downstream from the catalytic converter and thus an actual oxygen fill level that is too low or too high. This correction occurs discontinuously so as to be able to evaluate the reaction of the voltage of the lambda probe downstream from the catalytic converter. Since this reaction occurs with a delay due to the controlled system dead time and the storage behavior of the catalytic converter, it is provided that the correction is initially performed once when the lambda value of the signal of the second exhaust-gas probe allows for an inference to the actual oxygen fill level of the catalytic converter.

In the continuous adaptation, the lambda signal of a step-change lambda probe downstream from the catalytic converter is compared to the modeled lambda signal downstream from the catalytic converter. From this comparison, it is possible to derive a lambda offset between the lambda upstream from the catalytic converter and the lambda downstream from the catalytic converter. The lambda offset is used for example to correct a lambda setpoint value formed by a pilot control.

It also may be provided that a distinction is made between a lambda offset of the upstream lambda probe, i.e. an actual offset between the lambda upstream from the catalytic converter and the lambda downstream from the catalytic converter, and inaccuracies of the system model.

It further may be provided that an adaptation requirement is respectively learned and stored separately for a specific operating point or a specific class of operating points.

Another embodiment provides for an operating point to be defined by indicating a rotational speed and a relative combustion chamber filling. Other input variables for the characteristics map are also effective, however, in which there is a dependence of the model inaccuracies on these variables. When the engine is operated in a specific range of the engine speed and the relative load, the adaptation requirement is measured and is stored in the respective area of the adaptive characteristics map.

If in a certain operating point range, an adaptation requirement was already stored and an adaptation requirement is ascertained anew for this operating point or operating point range, it also may be provided that the already stored adaptation requirement is compared to the newly ascertained adaptation requirement and is replaced by an adaptation requirement that is determined on the basis of a result of the comparison.

It furthermore may be provided that an average value of the stored adaptation requirement values is ascertained, and that the average value is assessed as the actually existing lambda offset.

Another embodiment is characterized in that an operating point, at which an actually existing lambda offset results in an adaptation requirement that differs from the average adaptation requirement, is not taken into account when forming the average value.

Naturally, there may also be operating points at which an actual lambda offset—in deviation from the above-mentioned rule—results locally in an adaptation requirement that differs from the average adaptation requirement. Such characteristics map ranges may be excluded for the differentiation between model inaccuracies and the actually existing lambda offset and for the associated averaging.

It also may be provided that local deviations from the average value are assessed as inaccuracies of the system model. Inaccuracies of the system model typically result in a different adaptation requirement at different operating points because the real controlled system is not represented equally well by the model in all ranges, or because simplifying model assumptions do not result in inaccuracies of equal magnitude in all ranges. If the controlled system is correctly parameterized, one may assume that on average across the entire operating range there exists no systematic rich or lean trimming due to model inaccuracies. One may therefore assume that the adaptation requirements due to model inaccuracies cancel one another out on average across the entire adaptive characteristics map.

Normally, by contrast, an actually existing offset between the lambda upstream from the catalytic converter and the lambda downstream from the catalytic converter, which is due for example to an offset of the lambda probe upstream from the catalytic converter or a leak in the exhaust system, will result in the same or at least in a similar adaptation requirement independently of the operating point. Therefore, the adaptation requirement will be the same or at least similar across the entire adaptive characteristics map.

Because the adaptation requirements due to model inaccuracies cancel one another out on average across the entire characteristics map, and because an actually existing lambda offset results in the same or at least similar adaptation requirement in the entire characteristics map, the adaptation requirement averaged across the entire characteristics map is interpreted according to the present invention as the actually existing lambda offset. By contrast, local deviations from this adaptation requirement averaged across the entire characteristics map are interpreted as model inaccuracies.

If an adaptation requirement was already stored in the corresponding range in the characteristics map, no additional adaptation requirement should typically be necessary in this range. It is advantageous, however, to continue to record the adaptation requirement even in such ranges, and to compare the already stored adaptation requirement to the newly recorded adaptation requirement and to perform an adaptation if necessary. Gradually, the characteristics map is filled or updated with the corresponding adaptation requirement across the entire range of the rotational speed and the relative load.

An imminent departure from the catalytic converter window is detected earlier and emissions are reduced because the operating point-dependent storage of the adaptation requirement allows for a prompt compensation of model inaccuracies, since at an operating point that was already encountered earlier these model inaccuracies do not have to be adapted anew in a comparatively slow process. Instead, the necessary adaptation requirement is retrieved directly from the characteristics map and therefore takes immediate effect. The above-mentioned exclusion of individual characteristics map ranges for the differentiation between model inaccuracies and the actually existing lambda offset does not limit this immediate retrievability of the necessary adaptation requirements.

It furthermore may be provided that the adaptation occurs on multiple paths, a correction of the pilot control of a first control loop occurring via a first adaptation path (220), a modeled fill level of the catalytic converter, which is calculated by the pilot control using a catalytic converter model that is inverse with respect the catalytic converter model, being adapted via the first adaptation path to a real fill level of the catalytic converter, and the real fill level being ascertained from a signal of the output-side exhaust-gas probe.

It also may be provided that the fill level calculated using the catalytic converter model is adapted to the real fill level via a second adaptation path, the real fill level being ascertained from a signal of the output-side exhaust-gas probe. The adaptation may occur in each instance discontinuously.

It furthermore may be provided that the adaptation of the fill level calculated using the catalytic converter model to the real fill level occurs together with an adaptation of the fill level calculated by the pilot control using the inverse catalytic converter model to the real fill level, the discontinuously occurring adaptation processes being based on large and small signal values of the output-side exhaust-gas probe, a range of large signal values being separated from a range of small signal values by a range of medium signal values between the large signal values and the small signal values.

By way of the multi-step compensation according to the present invention of measuring and modeling uncertainties it is possible to improve the robustness of the model-based control. This makes it possible to reduce the emissions further. Stricter legal requirements may be satisfied at lower costs for the catalytic converter. This yields an even more improved model-based control of the fill level of a catalytic converter, by which a departure from the catalytic converter window is detected early and prevented.

With regard to the device aspects, it may be provided that the control unit is configured to carry out a method in accordance with one of the mentioned developments of the method.

Further advantages derive from the description and the attached figures.

It is understood that the features mentioned above and still to be explained below may be used not only in the respectively indicated combination, but also in other combinations, or by themselves, without departing from the scope of the present invention.

Exemplary embodiments of the present invention are depicted in the drawing and described in greater detail in the description below. In the various figures, the same reference numerals in each case designate the same elements or elements that are comparable in their functioning.

DETAILED DESCRIPTION

The present invention is described below with reference to the example of a three-way catalytic converter and for oxygen as the exhaust gas component to be stored. The present invention, however, may analogously also be applied to other catalytic converter types and exhaust gas components such as nitrogen oxides and hydrocarbons. For the sake of simplicity, an exhaust system having a three-way catalytic converter is assumed below. The present invention may analogously also be applied to exhaust system having multiple catalytic converters. In this case, the front and rear zones described below may extend across multiple catalytic converters or lie in different catalytic converters.

Figure 1:
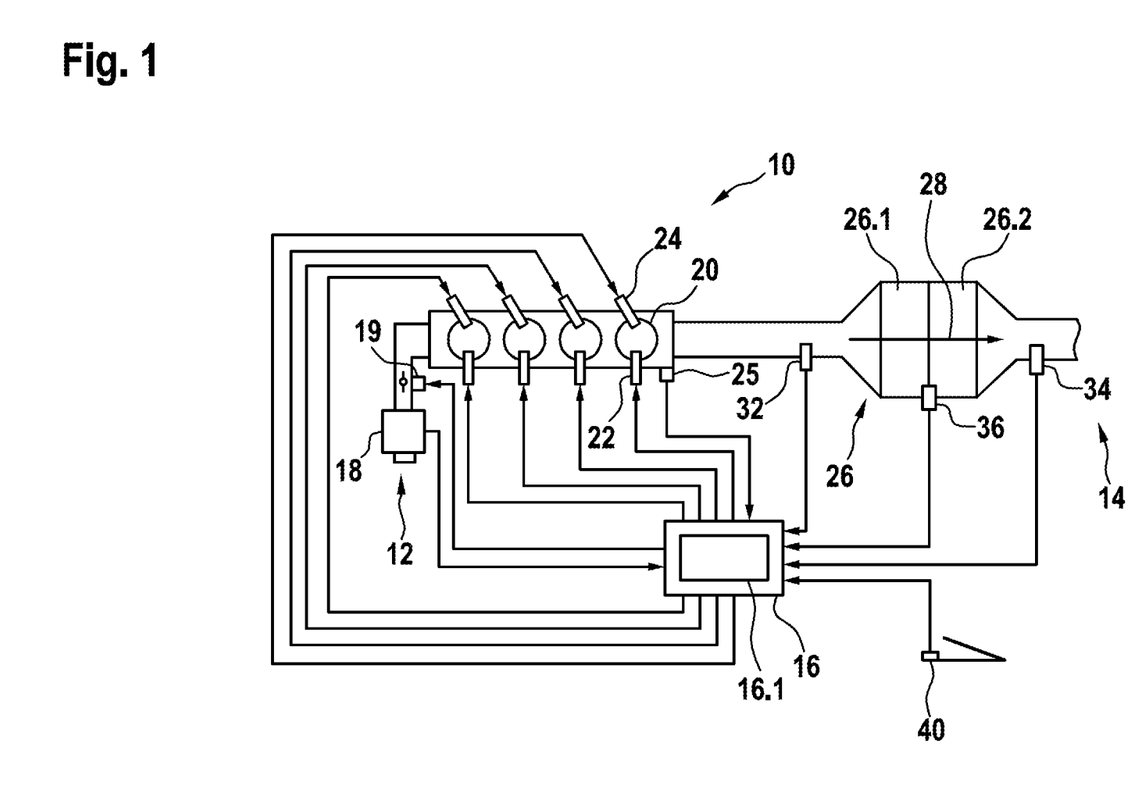
FIG. 1 shows an internal combustion engine including an air supply system, an exhaust system and a control unit.

In detail, FIG. 1 shows an internal combustion engine 10 having an air supply system 12, an exhaust system 14 and a control unit 16. Air supply system 12 comprises an air mass meter 18 and a throttle valve of a throttle valve unit 19 located downstream from air mass meter 18. The air flowing via supply system 12 into internal combustion engine 10 is mixed with fuel in combustion chambers 20 of internal combustion engine 10, which fuel is injected directly into combustion chambers 20 via fuel injectors 22. The present invention is not limited to internal combustion engines having direct injection, but may also be used with manifold injection or with gas-operated internal combustion engines. The resulting combustion chamber fillings are ignited by ignition devices 24, for example spark plugs, and are combusted. An angle-of-rotation sensor 25 detects the angle of rotation of a shaft of internal combustion engine 10 and thereby allows control unit 16 to trigger the ignitions at predefined angle positions of the shaft. The exhaust gas resulting from the combustions is discharged by exhaust system 14.

Exhaust system 14 includes a catalytic converter 26. Catalytic converter 26 is for example a three-way catalytic converter, which converts in a known manner the three exhaust gas components nitrogen oxides, hydrocarbons and carbon monoxide in three reaction paths and which has an oxygen-storing effect. Due to the oxygen-storing effect and because oxygen is a component of the exhaust gas, the catalytic converter has an exhaust-gas component store. In the example shown, three-way catalytic converter 26 has a first zone 26.1 and a second zone 26.2. Exhaust gas 28 flows through both zones. The first, front zone 26.1 extends in the direction of flow across a front area of three-way catalytic converter 26. The second, rear zone 26.2 extends downstream from first zone 26.1 across a rear area of three-way catalytic converter 26. It is possible, of course, for there to be additional zones upstream from front zone 26.1 and downstream from rear zone 26.2 as well as between the two zones, for which the respective fill level is possibly likewise modeled using a computational model.

Upstream from three-way catalytic converter 26, an input-side exhaust-gas probe 32 exposed to exhaust gas 28 is situated directly in front of three-way catalytic converter 26. Downstream from three-way catalytic converter 26, an output-side exhaust-gas probe 34 likewise exposed to exhaust gas 28 is situated directly behind three-way catalytic converter 26. Input-side exhaust-gas probe 32 may be a wide-band lambda probe, which allows for measuring the air ratio λ across a broad air ratio range. Output-side exhaust-gas probe 34 may be a so-called step-change lambda probe, which is able to measure the air ratio λ=1 with particular accuracy since the signal of this exhaust-gas probe 34 changes abruptly. Cf. Bosch, Kraftfahrtechnisches Taschenbuch (Automotive Handbook) 23rd Edition, page 524.

In the exemplary embodiment shown, a temperature sensor 36 exposed to exhaust gas 28 is situated on three-way catalytic converter 26 in thermal contact with exhaust gas 28, which measures the temperature of the three-way catalytic converter 26.

Control unit 16 processes the signals of air mass meter 18, angle-of-rotation sensor 25, input-side exhaust-gas probe 32, output-side exhaust-gas probe 34 and of temperature sensor 26 and from these forms control signals for setting the angular position of the throttle valve, for triggering ignitions by ignition device 24 and for injecting fuel by fuel injectors 22. Alternatively or additionally, control unit 16 also processes signals of other or additional sensors for controlling the actuators shown or also additional or other actuators, for example the signal of a driver command sensor 40, which detects an accelerator pedal position. An overrun operation with the fuel supply being switched off is triggered for example by releasing the accelerator pedal. These and the functions explained further below are executed by an engine control program 16.1 running in control unit 16 when internal combustion engine 10 is operated.

Reference is made in this application to a system model 100, a catalytic converter model 102, an output lambda model 106 (compare FIG. 2) and an inverse catalytic converter model. The models are respectively algorithms, in particular systems of equations, which are executed or computed in control unit 16 and which link input variables, which also act on the real object emulated by the computational model, to form output variables in such a way that the output variables computed by the algorithms correspond to the output variables of the real object as accurately as possible.

Figure 2:
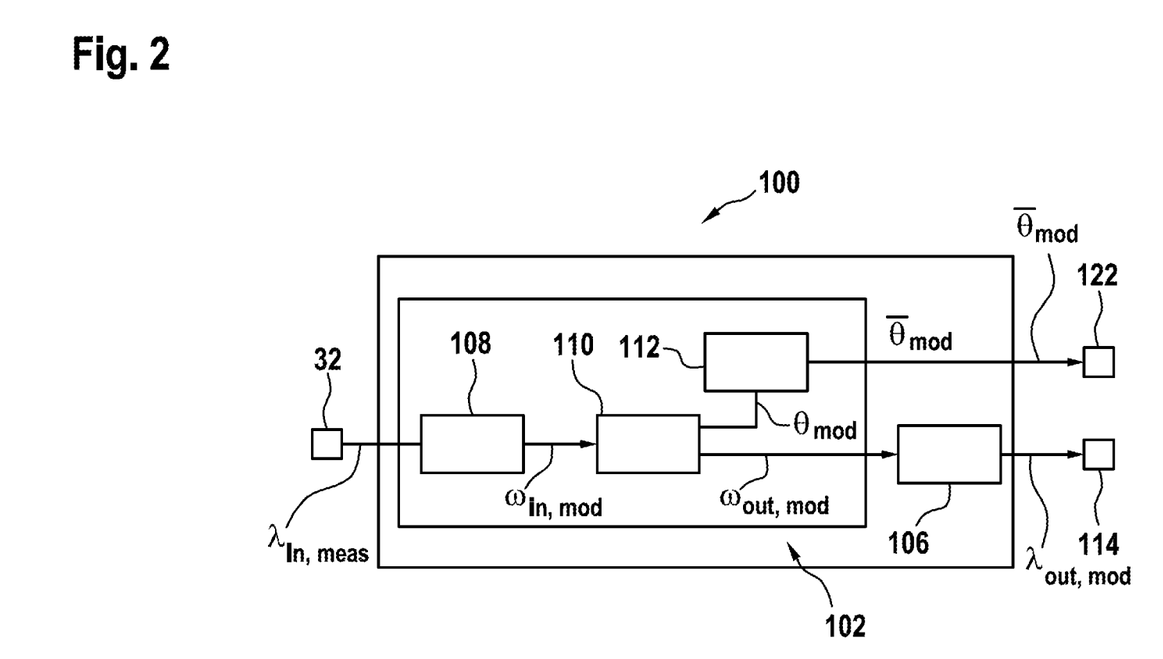
FIG. 2 shows a function block representation of a system model.

FIG. 2 shows a function block representation of a system model 100. System model 100 is made up of catalytic converter model 102 and output lambda model 106. Catalytic converter model 102 has an input emission model 108 and a fill level and output emission model 110. Catalytic converter model 102 furthermore has an algorithm 112 for calculating an average fill level $\bar{\theta}_{mod}$ of catalytic converter 26.

Input emission model 108 is configured to convert as the input variable the signal $\lambda_{in,meas}$ of exhaust-gas probe 32 situated upstream from three-way catalytic converter 26 into input variables $w_{in,mod}$ required for the subsequent fill level and output emission model 110. It is advantageous, for example, to convert lambda into the concentrations of $O_2$, $CO$, $H_2$ and HC upstream from three-way catalytic converter 26 using input emission model 108.

Using the variables $w_{in,mod}$ calculated by input emission model 108 and, if indicated, additional input variables (e.g. exhaust-gas or catalytic converter temperatures, exhaust-gas mass flow and current maximum oxygen storage capacity of three-way catalytic converter 26), fill level and output emission model 110 models a fill level $\theta_{mod}$ of three-way catalytic converter 26 and concentrations $w_{out,mod}$ of the individual exhaust-gas components at the output of three-way catalytic converter 26.

In order to be able to model filling processes and discharging processes in a more realistic manner, three-way catalytic converter 26 may be conceptually divided by the algorithm into several zones or partial volumes 26.1, 26.2 succeeding one another in the direction of flow of exhaust gases 28, and, using the reaction kinetics, the concentrations of the individual exhaust-gas components are ascertained for each of these zones 26.1, 26.2. These concentrations in turn may be converted respectively into a fill level of the individual zones 26.1, 26.2, which may be into the oxygen fill level standardized to the current maximum oxygen storage capacity.

The fill levels of individual or of all zones 26.1, 26.2 may be combined using a suitable weighting to form a total fill level that reflects the state of three-way catalytic converter 26. For example, in the simplest case, it is possible to weight the fill levels of all zones 26.1, 26.2 equally and thereby to ascertain an average fill level. Using a suitable weighting, however, it is also possible to take into account the fact that for the current exhaust-gas composition downstream from three-way catalytic converter 26 the fill level in a comparatively small zone 26.2 at the output of three-way catalytic converter 26 is decisive, while for the development of the fill level in this small zone 26.2 at the output of three-way catalytic converter 26 the fill level in the upstream zone 26.1 and its development are decisive. For the sake of simplicity, an average oxygen fill level is assumed below.

The algorithm of output lambda model 106 converts the concentrations $w_{out,mod}$ calculated by catalytic converter model 102 of the individual exhaust-gas components at the output of catalytic converter 26 for the adaptation of system model 100 into a signal $\lambda_{out,mod}$ that may be compared with the signal $\lambda_{out,meas}$ of the exhaust-gas probe 34 located downstream from catalytic converter 26. The lambda downstream from three-way catalytic converter 26 may be modeled. Output lambda model 106 is not necessarily required for pilot control on the basis of a setpoint oxygen fill level.

Controlled system model 100 is thus used on the one hand to model at least one average fill level $\bar{\theta}_{mod}$ of catalytic converter 26, which is adjusted to a setpoint fill level, at which catalytic converter 26 is safely within the catalytic converter window (and is thus able both to take up as well as give off oxygen). On the other hand, system model 100 provides a modeled signal $\lambda_{out,mod}$ of the exhaust-gas probe 34 located downstream from catalytic converter 26. An explanation will be provided further below as to how this modeled signal $\lambda_{out,mod}$ of the output-side exhaust-gas probe 34 is advantageously used for adapting the system model 100. The adaptation is performed in order to compensate for uncertainties, which encumber the input variables of the system model, in particular the signal of the lambda probe upstream from the catalytic converter. The pilot control is likewise adapted.

Figure 3:
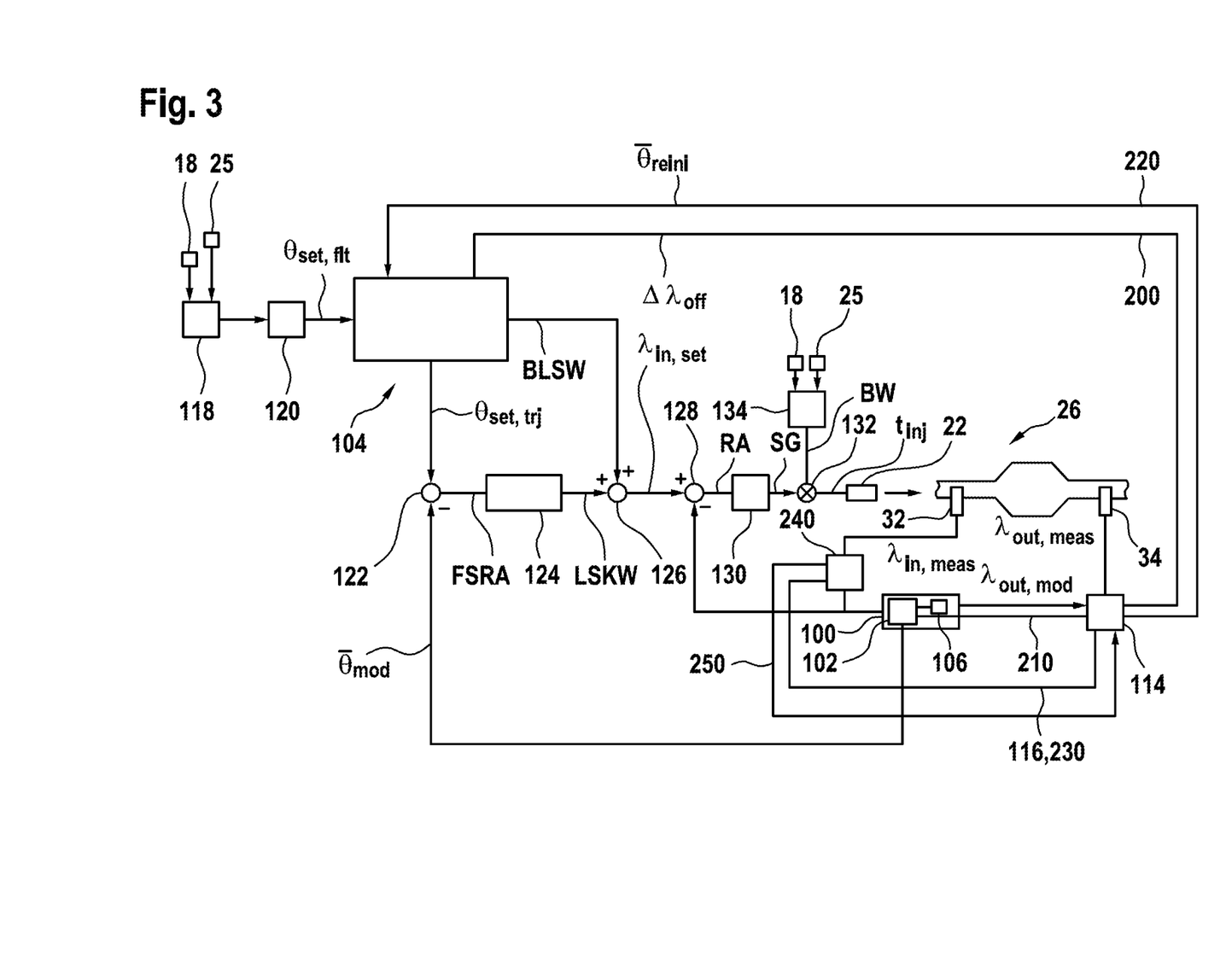
FIG. 3 shows a function block representation illustrating both method aspects as well as device aspects of the present invention.

FIG. 3 shows a function block representation illustrating both method aspects as well as device aspects of the present invention. FIG. 3 shows in detail that the signal $\lambda_{out,mod}$ modeled by output lambda model 106 of output-side exhaust-gas probe 34 and the real output signal $\lambda_{out,meas}$ of output-side exhaust-gas probe 34 are supplied to an adaptation block 114. Adaptation block 114 compares the two signals $\lambda_{out,mod}$ and $\lambda_{out,meas}$ with one another. For example, a step-change lambda probe situated as exhaust-gas probe 34 downstream from three-way catalytic converter 26 indicates unequivocally when three-way catalytic converter is completely filled with oxygen or is completely emptied of oxygen.

Following lean or rich phases, this information may be utilized to bring the modeled oxygen fill level or the modeled output lambda $\lambda_{out,mod}$ into agreement with the lambda $\lambda_{out,meas}$ measured downstream from three-way catalytic converter 26 and to adapt system model 100 in the event of deviations.

A first adaptation path 220 beginning from adaptation block 114 leads to pilot control 104. Via this adaptation path 220, the modeled fill level used in the inverse catalytic converter model of pilot control 104 is adapted to the real fill level. This corresponds to a discontinuous correction (or a re-initialization) of the modeled fill level in pilot control 104.

A second adaptation path 210 beginning from adaptation block 114 leads to system model 100. Via the second adaptation path 210, the modeled fill level used in system model 100 is adapted to the real fill level. This corresponds to a discontinuous correction (or a re-initialization) of the modeled fill level in system model 100.

The two interventions of the discontinuous correction may always occur together, i.e. simultaneously, since the pilot control is configured as an inversion of the system model. Otherwise, inconsistencies of the modeled fill levels would result in the two function blocks of system model 100 and of pilot control 104.

These interventions form a first adaptation step. These discontinuously occurring adaptation processes are based on large and small (but not on medium) signal values of output-side exhaust-gas probe 34.

A third adaptation path 200 beginning from adaptation block 114 leads to pilot control 104. A continuous adaptation, which is based on medium signal values of output-side exhaust-gas probe 34, is performed via third adaptation path 200. In the case of these medium signal values, the signal of output-side exhaust-gas probe 34 indicates the lambda value of the exhaust gas accurately. If an offset $\Delta\lambda_{offs}$ occurs in the lambda control loop, which may occur as a result of an error in the input-side exhaust-gas probe 32 or a leakage air supply to the exhaust gas between the two exhaust-gas probes, the signal of output-side exhaust-gas probe 34 occurring in the range of medium signal values will indicate this offset $\Delta\lambda_{offs}$ as a deviation from an expected value. The deviation is ascertained in block 114 for example as a difference between the signal value and the expected value and is stored as an adaptation requirement in an adaptive characteristics map.

An adaptation requirement exists when the two values (signal value and expected value) differ, in particular by more than a predefined threshold value. It is advantageous to correct for example the setpoint lambda value for the input-side lambda value and the ascertained setpoint fill level trajectory using a lambda offset value $\Delta\lambda_{offs}$, which represents a measure for the adaptation requirement. This measure for the adaptation requirement results from the difference between the output-side lambda value $\lambda_{out,mod}$ modeled with the aid of the system model and the measured output-side lambda value $\lambda_{out,meas}$, in particular as their difference as lambda offset value $\Delta\lambda_{offs}$. This correction is finally used to influence a system deviation RA at the input of a lambda controller 130.

By correcting the setpoint lambda value for the input-side lambda value, the lambda control is able to react immediately to changes of the lambda offset value $\Delta\lambda_{offs}$. Since the system model 100 is adapted, the modeled medium fill level $\theta_{mod}$ indeed deviates from the actual fill level, but since the setpoint fill level setpoint value trajectory is likewise adapted, it follows the false modeled fill level 100 so that fill level controller 124 sees the same system deviation before and after the adaptation. Jumps in the system deviation, which could result in the development of resonant oscillations in the fill level control, are thereby avoided.

It is advantageous to smoothen the measure for the adaptation requirement, i.e. a difference between the modeled output-side lambda value $\lambda_{out,mod}$ and the measured output-side lambda value $\lambda_{out,meas}$, with the aid of a filter in an adaptation block in order to obtain the lambda offset value $\Delta\lambda_{offs}$. The filter may be developed as a PTI filter for example and may have an operating point-dependent time constant, which may be retrieved from a correspondingly parameterizable characteristics map. The filter optionally may be followed downstream by an integrator in order to take long-term effects into account. In the steady state, the filtered signal corresponds precisely to the adaptation requirement.

It is furthermore expedient to store the adaptation value at the end of a driving cycle, and to use the respective adaptation value as an initial value in a subsequent driving cycle.

In one development, there is also an option to have a fourth adaptation path 230. The fourth adaptation path runs from adaptation block 114 to a block 240, in which a lambda actual value of the input-side exhaust-gas probe 32 is additively linked to the lambda offset value $\Delta\lambda_{offs}$.

The adaptation continuously occurring at the lambda level should expediently result sooner or later in a correction at the place at which the lambda offset has its cause. Normally, this will be the case at the input-side exhaust-gas probe 32. For this reason it is advantageous to use signal $\Delta\lambda_{offs}$ to correct the measuring signal $\lambda_{in,meas}$ of input-side exhaust-gas probe 32. This occurs in block 240 in FIG. 3. So that this does not result in a double correction in the pilot control and in block 240, a handshake between blocks 240 and adaptation block 114 is advantageous. The handshake occurs for example via a handshake path 250 in such a way that the correction signal for the block of pilot control 104 is reduced by the absolute value that is linked in block 240 to the actual value of the signal of the input-side exhaust-gas probe 32. In addition, one of the two corrections may be multiplied for example by a factor x where 0<x<1, if the other of the two corrections is multiplied by the factor (1−x).

Overall, the various adaptation processes compensate for inaccuracies of measuring variables or model variables that enter into system model 100. From the fact that the modeled value $\lambda_{out,mod}$ corresponds to the measured lambda value $\lambda_{out,meas}$ it is possible to draw the inference that the fill level $\overline{\theta}_{mod}$, modeled by system model 100 or by first catalytic converter model 102, also corresponds to the fill level of the three-way catalytic converter 26 that cannot be measured using an on-board apparatus/device. Then there may be a further inference that the second catalytic converter model, which forms a part of pilot control 104 and which is inverse with respect to first catalytic converter model 102, also describes the behavior of the modeled controlled system correctly.

This may be used to calculate a base lambda setpoint value with the aid of the inverse second catalytic converter model, which forms a part of the pilot control 104. For this purpose, pilot control 104 is supplied with a fill level setpoint value $\overline{\theta}_{set,flt}$ as input variable, which was filtered by an optional filtering 120. Filtering 120 is performed so as to permit only those changes of the input variable of pilot control 104 which the controlled system as a whole is able to follow. For this purpose, a still unfiltered setpoint value $\overline{\theta}_{set}$ is read out of a memory 118 of control unit 16. For this purpose, memory 118 may be addressed using current operating parameters of internal combustion engine 10. The operating parameters are for example, but not necessarily, the rotational speed detected by rotational speed sensor 25 and the relative filling rl or another variable representing the load of the internal combustion engine, for example a intake air quantity of internal combustion engine 10 measured by air mass meter 18.

In pilot control block 104, a pilot control lambda value is determined as the base lambda setpoint value BLSW on the one hand, and a setpoint fill level trajectory is determined as a function of the filtered fill level setpoint value on the other hand. In parallel to this determination, in a linkage 122, a fill level system deviation FSRA is formed as a deviation of the fill level $\overline{\theta}_{mod}$ modeled by system model 100, or of the fill level $\overline{\theta}_{mod}$ modeled by first catalytic converter model 102, from the filtered fill level setpoint value $\overline{\theta}_{set,flt}$, or from the setpoint fill level trajectory. This fill level system deviation FSRA is supplied to a fill level control algorithm 124, which uses it to form a lambda setpoint value correction value LSKW. In linkage 126, this lambda setpoint value correction value LSKW is added to the base lambda setpoint value BLSW computed by pilot control 104.

The sum thus formed may be used as setpoint value $\lambda_{in,set}$ of a conventional lambda control. From this lambda setpoint value $\lambda_{in,set}$ the lambda actual value $\lambda_{in,meas}$ provided by first exhaust-gas probe 32 is subtracted in a linkage 128. The system deviation RA thus formed is converted into a correcting variable SG, which is linked in a linkage 132, for example multiplicatively, to a base value BW of an injection pulse width $t_{inj}$ specified as a function of operating parameters of internal combustion engine 10. Base values BW are stored in a memory 134 of control unit 16. Here too, the operating parameters may be, but not necessarily, the load and the rotational speed n of internal combustion engine 10. Fuel injectors 22 are controlled using the injection pulse width $t_{inj}$ resulting from the product. The load is for example a combustion chamber filling rl with air relative to a maximum combustion chamber filling with air.

In this manner, the conventional lambda control occurring in a first control loop has superimposed on it a control of the oxygen fill level of catalytic converter 26, which occurs in a second control loop. For this purpose, the medium oxygen fill level $\overline{\theta}_{mod}$ modeled with the aid of system model 100 is adjusted for example to a setpoint value $\overline{\theta}_{set,flt}$ which minimizes the probability of breakthroughs to lean and rich and thus results in minimal emissions. Due to the formation of the base lambda setpoint value BLSW by the inverted second system model of pilot control 104, the system deviation of the fill level control becomes zero when the modeled medium fill level $\overline{\theta}_{mod}$ is identical to the prefiltered setpoint fill level $\overline{\theta}_{set,flt}$. The implementation of the pilot control 104 as an inversion of system model 100 has the advantage that the fill level control algorithm 124 only needs to intervene when the actual fill level of the catalytic converter modeled by the system model deviates from the filtered fill level setpoint value $\overline{\theta}_{set,flt}$ or the unfiltered fill level setpoint value $\overline{\theta}_{set}$.

While system model 100 converts the input lambda upstream from the catalytic converter into a medium oxygen fill level of the catalytic converter, the pilot control 104 implemented as an inverted system model converts the medium setpoint oxygen fill level into a corresponding setpoint lambda upstream from the catalytic converter.

Pilot control 104 has a numerically inverted computing model, which is based on a first system model 100 for catalytic converter 26, which is assumed to be known. Pilot control 104 in particular has a second system model, whose system of equations is identical to the system of equations of first controlled system model 100, but which is supplied with different input variables.

Pilot control 104 provides a pilot control lambda value BSLW for a lambda control and a setpoint fill level trajectory $\overline{\theta}_{set,trj}$ as a function of the filtered fill level setpoint value. For calculating the pilot control lambda value BSLW, which corresponds to the filtered fill level setpoint value, pilot control block 104 contains a computational model that corresponds to a system model that is inverse with respect to system model 100, that is, a model that assigns a base lambda setpoint value BLSW to a filtered fill level setpoint value as the provisional pilot control lambda value. When a suitable BLSW is chosen, the desired fill level sets in.

The advantage of this manner of proceeding is that it is only necessary to solve the system of equations for the forward system model 100 or 100' another time, but not the system of equations for the backward system model of pilot control 104 from FIG. 3, which is solvable only with great computing expenditure or is not solvable.

The system of equations to be solved is solved iteratively by inclusion methods such as for example bisection methods or regula falsi. The base lambda setpoint value is iteratively changed in the process. Inclusion methods such as regula falsi are generally known. They are characterized by the fact that they do not only deliver iterative approximation values, but that they also delimit these from both sides. The computing expenditure for determining the accurate base lambda setpoint value BLSW is thereby clearly limited.

In order to minimize the computing expenditure in control unit 16, iteration limits may be defined, which determine the range in which the iteration is performed. These iteration limits may be defined as a function of the current operating conditions. It is advantageous for example to perform the iteration only at what may be the smallest possible interval around the expected setpoint lambda BLSW. When defining the iteration limits, it is furthermore advantageous to take into account the intervention of fill level controller 124 and interventions of other functionalities in the setpoint lambda BLSW.

With the exception of exhaust system 26, exhaust-gas probes 32, 34, air mass meter 18, angle-of-rotation sensor 25 and fuel injectors 22, all of the elements shown in FIG. 3 are components of a control unit 16 according to the present invention. With the exception of memories 118, 134, all of the remaining elements from FIG. 3 are components of the engine control program 16.1, which is stored in and runs in control unit 16.

Elements 22, 32, 128, 130 and 132 form the first control loop, in which a lambda control occurs in which the signal $\lambda_{in,meas}$ of first exhaust-gas probe (32) is processed as the lambda actual value. The lambda setpoint value $\lambda_{in,set}$ of the first control loop is formed in the second control loop, which has the elements 22, 32, 100, 122, 124, 126, 128, 132.

With respect to the various adaptation possibilities, it may be provided that a continuous adaptation is combined with at least one discontinuous correction. For this purpose, use is made of the fact that it is possible to derive two fundamentally different conclusions about the state of the catalytic converter from the voltage signal of a step-change lambda probe downstream from the catalytic converter, that these conclusions are respectively valid only in specific voltage ranges of the voltage signal, and that there are voltage ranges in which only the one or only the other conclusion or both conclusions simultaneously are possible. The transitions between the ranges are fluid.

If the output-side exhaust-gas probe 34 downstream from catalytic converter 26 clearly indicates a high or a low voltage, its signal value correlates with the current fill level of the catalytic converter. This is the case in particular when the signal value does not correspond to a lambda in the range of 1. In this case, the catalytic converter is emptied of oxygen or is filled with oxygen to such an extent that rich exhaust gas or lean exhaust gas break through respectively. In these cases, it is normally not possible to make an assertion regarding the exhaust gas lambda since the lambda accuracy of the signal value is here greatly impaired by temperature effects, cross sensitivities and the gentle characteristic of the voltage-lambda curve of the step-change lambda probe as exhaust-gas probe 34.

In a narrow range around lambda=1, the signal value of output-side exhaust-gas probe 34 (step-change lambda probe) corresponds to the exhaust gas lambda downstream from the catalytic converter. In this range, the lambda accuracy is very high due to the steep characteristic of the voltage-lambda curve and the low temperature dependence and cross sensitivities. An assertion regarding the current fill level of catalytic converter 26 is normally not possible in this case because, in a comparatively large fill level range, catalytic converter 26 is able to set an exhaust gas lambda of 1 as long as it is still possible to store the oxygen released in the reduction of exhaust gas components or to discharge the oxygen required for the oxidation of exhaust gas components.

In the transitions between these ranges, the signal value of output-side exhaust-gas probe 34 correlates at the same time both with the current fill level as well as with the current exhaust gas lambda downstream from the catalytic converter, albeit with respectively limited accuracy.

For this reason, one development provides for multiple ranges as a function of the voltage/the signal value of output-side exhaust-gas probe 34, in which only a continuous adaptation by using the lambda information or only a discontinuous correction by using the fill level information or both a continuous adaptation as well as a discontinuous correction by using both items of information is effective.

It is expedient for example to distinguish the following five voltage ranges of the voltage signal values of output-side exhaust-gas probe 34:
1) Very high voltage signal values (e.g. higher than 900 mV). Here there occurs a discontinuous correction of the modeled oxygen fill level to a very low value. A continuous adaptation does not occur.
2) High voltage signal values (e.g. between 900 mV and 800 mV): Here the modeled oxygen fill level is discontinuously corrected to a low value, and a continuous adaptation of a lambda offset between the lambda upstream from the catalytic converter and the lambda downstream from the catalytic converter is superimposed.
3) Medium voltage signal values (e.g. between 800 mV and 600 mV): Here a lambda offset between the lambda upstream from the catalytic converter and the lambda downstream from the catalytic converter is continuously adapted. A discontinuous adaptation does not occur.
4) Low voltage signal values (e.g. between 600 mV and 400 mV): Here the modeled oxygen fill level is discontinuously corrected to a high value, and a continuous adaptation of a lambda offset between the lambda upstream from the catalytic converter and the lambda downstream from the catalytic converter is superimposed.
5) Very low voltage signal values (e.g. less than 400 mV): Here there occurs a discontinuous correction of the modeled oxygen fill level to a very high value. A continuous adaptation does not occur.

The numerical values depend greatly on the type of exhaust-gas probe utilized, and are to be understood merely by way of example. It goes without saying that further ranges may be added and that ranges may be combined or left out.

A discontinuous correction of the modeled fill level as in the ranges 1), 2), 4) and 5) results in a deviation of the modeled fill level from the setpoint value. This is subsequently corrected. The deviation results in an adjustment of the air-fuel mixture in the direction of the setpoint value of the fill level control and very quickly brings the catalytic converter in the direction of the catalytic converter window. It thus results immediately in an emission improvement and is able to compensate quickly for larger inaccuracies of measurement and modeling.

Following such a correction phase, that is, as soon as the system deviation is compensated as a result of the correction, the catalytic converter should again be within the catalytic converter window and should remain there as a result of the control process. This assumes that the uncertainties of measuring and modeling variables, which enter the system model, and the model inaccuracies are sufficiently small. If this assumption is not fulfilled, the catalytic converter window will be abandoned again after a certain time in spite of the control process because the modeled fill level that is adjusted does not correspond to the actual fill level so that a renewed correction of the modeled fill level becomes necessary.

If such a correction is repeatedly necessary in ranges 1) and 5), a greater uncertainty of measurement or modeling must be assumed. In order to compensate for this uncertainty and at the same time to avoid further repetitions of the correction, it is advantageous, in the ranges 1) and 5), to calculate, for example according to the following formula, a lambda offset $\lambda_{Offs}$ between the lambda upstream from the catalytic converter and the lambda downstream from the catalytic converter from the oxygen quantity, entered into or removed from the catalytic converter following a first correction phase until a second correction phase, and from the correction requirement Δθ·OSC for the fill level, which is ascertained during the second correction phase, and to correct for example the signal value of the input-side exhaust-gas probe 32 accordingly:

$$\lambda_{Offs} = \frac{1}{1 - \frac{\Delta\theta \cdot OSC}{K \cdot \int \dot{m}_{air}}} - 1$$

In this case, K·ṁ_air is the oxygen quantity entered into or removed from the catalytic converter 26 between two discontinuous corrections and Δθ·OSC is the correction requirement for the fill level ascertained in the second correction phase. Δθ is a number between −1 and 1 and OSC is the maximum oxygen storage capacity of the catalytic converter.

In the ranges 2) and 4), there is typically only a small measurement or model inaccuracy, which ideally may be compensated already by a single correction of the modeled oxygen fill level and the superimposed continuous adaptation of the lambda offset $\lambda_{Offs}$ to such an extent that the voltage of the lambda probe is subsequently in range 3).

As soon as this is the case, it may be assumed that only a small measurement or model uncertainty still needs to be compensated. This is accomplished with high accuracy by the continuous adaptation. Due to the lower lambda accuracy of the signal of the output-side exhaust-gas probe 34 in the ranges 2) and 4), it is advantageous to weight the lambda offset $\lambda_{Offs}$ ascertained in these ranges by the continuous adaptation less strongly than in range 3). It is likewise advantageous to take into account the lower accuracy of the fill level information of the signal of the lambda probe downstream from the catalytic converter in the ranges 2) and 4) in that the ascertained correction requirement is attenuated so as to avoid an overcorrection reliably.

Figure 4:
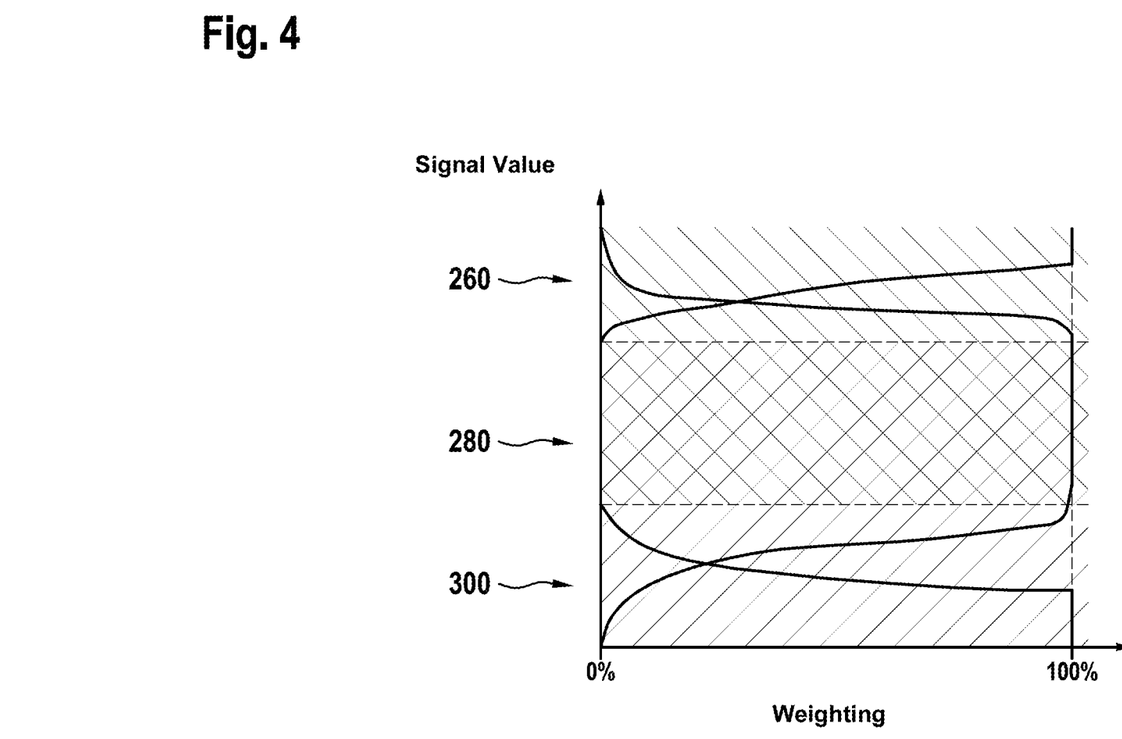
FIG. 4 shows voltage ranges of an output-side exhaust-gas probe over a weighting scale.

In a particularly specific embodiment, only three ranges of the voltage of the lambda probe downstream from the catalytic converter are distinguished:

FIG. 4 represents in an exemplary manner for n ranges of the voltage of output-side exhaust-gas probe 34 three voltage ranges of an output-side exhaust-gas probe 34 over a weighting scale.

A first range 260 of large signal values is characterized by high probe voltages/signal values, which are greater than 800 mV for example. In this range, in a first step, a quick, discontinuous correction is performed of the modeled oxygen fill level to a low value, which depends on the probe voltage. In addition, a precise, slower ascertainment of a lambda offset $\lambda_{Offs}$ between the lambda upstream from the catalytic converter and the lambda downstream from the catalytic converter is performed, the weight of the continuous adaptation decreasing with increasing probe voltage and the weight of the discontinuous adaptation increasing with increasing probe voltage/signal value.

A second range 280 of medium signal values is characterized by medium probe voltages/signal values, which are for example (around lambda=1) between 800 mV and 600 mV. In this range, only a continuous adaptation of a lambda offset $\lambda_{Offs}$ between the lambda upstream from the catalytic converter and the lambda downstream from the catalytic converter is performed. A discontinuous adaptation does not occur.

A third range 300 of small signal values is characterized by low probe voltages/signal values, which are smaller than 600 mV for example. In this range, in a first step, a quick, discontinuous correction is performed of the modeled oxygen fill level to a high value, which depends on the probe voltage. In addition, a precise, slower ascertainment of a lambda offset $\lambda_{Offs}$ between the lambda upstream from the catalytic converter and the lambda downstream from the catalytic converter is performed, the weight of the continuous adaptation decreasing with decreasing probe voltage and the weight of the discontinuous adaptation increasing with decreasing probe voltage.

The reduced lambda accuracy of the signal value of the output-side exhaust-gas probe 34 in first range 260 and in third range 300 as well as the decreased accuracy of the fill level information of the signal value of a step-change lambda probe as output-side lambda probe 34 at a medium probe voltage is taken into account by the different weighting of the results of the continuous lambda offset adaptation and the discontinuous lambda offset ascertainment.

It may be provided that the individual corrections and adaptations occur only when suitable operating conditions obtain so as to avoid a faulty correction or adaptation. For example, it goes without saying that all of the mentioned corrections and adaptations may only be performed successfully if the signal of the exhaust gas-side exhaust-gas probe 34 is reliable, that is, in particular only if this exhaust-gas probe 34 is operational. Independent switch-on conditions may be selected for the individual corrections and adaptations, which make it possible for each correction or adaptation to be active as frequently as possible, without this resulting in a faulty correction or adaptation.

The use according to the invention of two different items of information about the state of the catalytic converter and the consideration of the reliability of this information in different ranges of the underlying measuring signal make it possible to compensate for measuring and model inaccuracies more quickly and at the same time more robustly than hitherto with the required accuracy.

Figure 5:
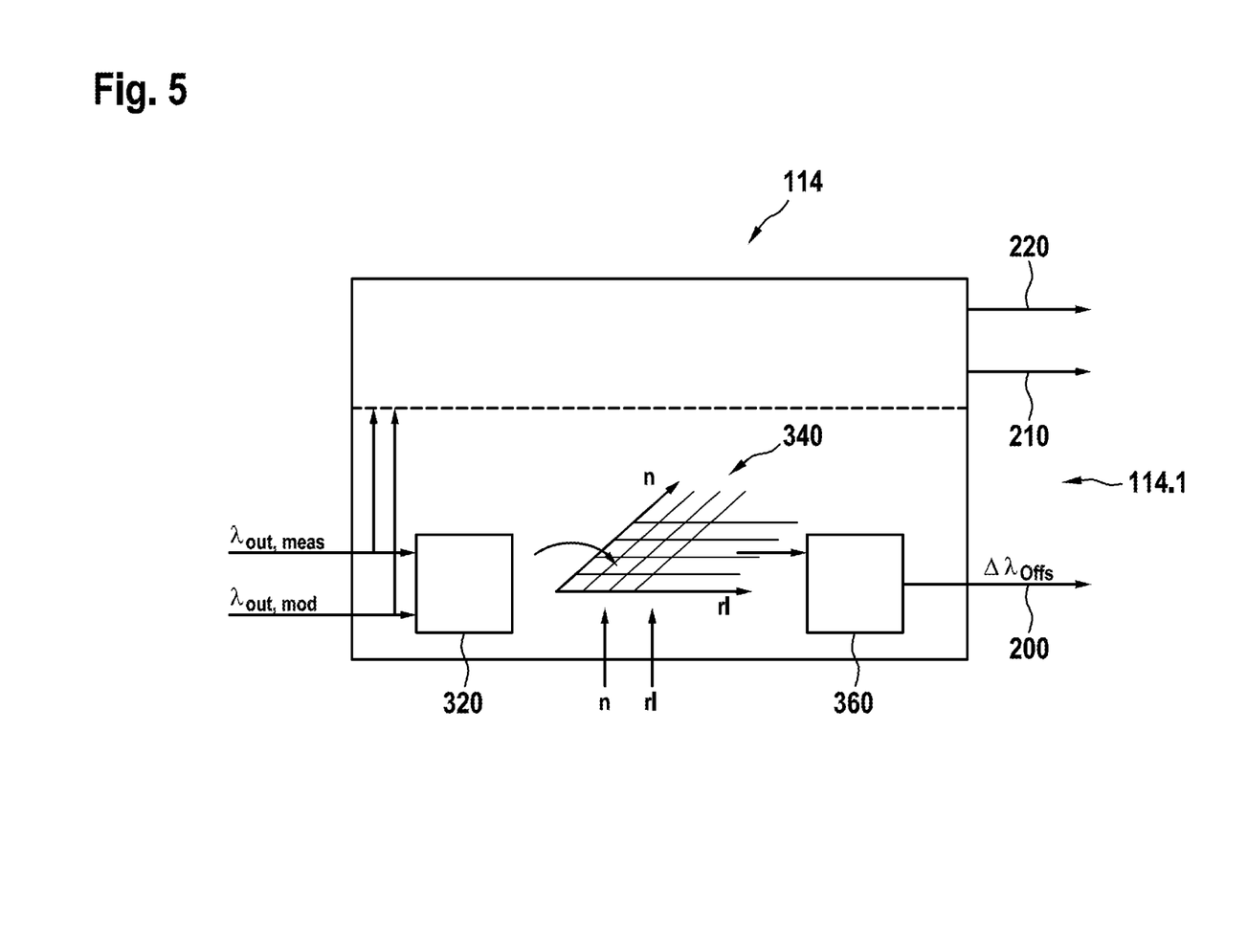
FIG. 5 shows details supplementing the function block representation of FIG. 3 with respect to an exemplary embodiment of the present invention.

FIG. 5 shows details of a development of the adaptation value formation in adaptation block 114 of FIG. 3.

Adaptation block 114 processes as input signals the measurement value $\lambda_{in,meas}$ and the value $\lambda_{out,mod}$ computationally modeled by system model 100 for the signal of the output-side exhaust-gas probe into an adaptation requirement, or into correction values, which correspond to the adaptation requirement. Moreover, values of operating parameters are supplied to adaptation block 114, which are suitable for defining operating points. Examples of such operating parameters are the load or the relative filling rl, and the rotational speed n of the internal combustion engine. Alternatively or additionally, it is also possible to use other operating parameters for defining operating points.

In the example shown, adaptation block 114 has three outputs. One output respectively feeds one of the three adaptation paths 200, 210 and 220. A part 114.1 of the adaptation block is used to form the lambda offset $\lambda_{Offs}$, which is fed into adaptation path 200.

Part 114.1 includes an adaptation value formation block 320, in which adaptation requirement values are formed from deviations of the measurement value $\lambda_{out,meas}$ from the computationally modeled value lambdaoutmod $\lambda_{out,mod}$ for individual operating points or for classes of operating points in a class-specific manner.

In order to determine the lambda offset $\lambda_{Offs}$, the adaptation requirement occurring on the whole for an individual operating point is ascertained. This ascertainment occurs individually for each operating point or respectively for a subset of the operating points that have a similar adaptation requirement. These adaptation requirement values are stored individually for operating points or individually for classes in a non-volatile memory of control unit 16, for example in an adaptive characteristics map 340 of control unit 16. In one development, the operating points are defined by the relative filling and the rotational speed of the internal combustion engine.

An average value formation block 360 forms an average from a plurality of adaptation requirement values that are stored individually for operating points or individually for classes. This average value corresponds to a lambda offset $\lambda_{Offs}$, by which the formation of the system deviation RA for the first control loop is corrected. The third adaptation path 200 beginning from adaptation block 114 leads to pilot control 104. An adaptive correction of a lambda offset $\lambda_{Offs}$ is performed via third adaptation path 200.

The adaptation requirement values may contain essentially two portions that differ from each other in terms of their cause. A first cause is a deviation of the lambda value measured by the upstream, input-side exhaust-gas probe 32 from the lambda value measured by the output-side exhaust-gas probe 34. This cause, which is also referred to as lambda offset $\lambda_{Offs}$ generally does not vary or varies only slightly with changes of the operating points, that is, it is the same or at least very similar for most operating points.

A second cause lies in inaccuracies of the system model and of the inverse system model of the pilot control. These inaccuracies may vary from operating point to operating point more greatly than an adaptation requirement caused by a lambda offset $\lambda_{Offs}$.

The adaptation requirement caused by a lambda offset $\lambda_{Offs}$ is separated from the adaptation requirement caused by inaccuracies of the computational models by the averaging of the adaptation requirement values stored in the characteristics map memory. The average value is assessed as a lambda offset $\lambda_{Offs}$. Deviations from the average value are assessed as caused by the inaccuracies of the computational models.

In one development, the lambda offset $\lambda_{Offs}$ determined in this manner is used to correct the system deviation RA for the first control loop, which is supplied to lambda controller 130.

In the structure represented in FIG. 3, the system deviation is the sum of the base lambda setpoint value BSLW, the lambda probe correction value and a lambda actual value measured by the input-side exhaust-gas probe 32. The summands, of course, are to be added in terms of their respective sign. The lambda offset) $\lambda_{Offs}$ is an additive component of the base lambda setpoint value BSLW. It may be positive or negative for example. Alternatively, the lambda offset $\lambda_{Offs}$ may also be added to the lambda setpoint correction value LSKW, to the sum of LSKW and BLSW or to the lambda actual value. In each of these alternatives, the lambda offset $\lambda_{Offs}$ may also be supplied to pilot control 104 and may be taken into account in the formation of the setpoint value trajectory.

What is claimed is:

1. A method for controlling a fill level of an exhaust gas component store of a catalytic converter of an internal combustion engine, the method comprising:
controlling the fill level using a system model, which includes a catalytic converter model, and uncertainties of measurement or model variables, which influence the control of the fill level, being corrected by an adaptation that is based on signals of an exhaust-gas probe situated on the output side of the catalytic converter;
wherein an adaptation requirement is learned as a function of the operating point, the learned adaptation requirement is stored as a function of the operating point, and a distinction is made based on the operating point dependence between different causes of the uncertainties.

2. The method of claim 1, wherein an adaptation requirement is ascertained using a multi-step process.

3. The method of claim 2, wherein a distinction is made between a lambda offset of an upstream exhaust-gas probe and inaccuracies of the system model.

4. The method of claim 1, wherein an adaptation requirement is respectively learned and stored separately for a specific operating point or a specific class of operating points.

5. The method of claim 1, wherein an operating point is defined by indicating a rotational speed and a load variable of the internal combustion engine.

6. The method of claim 1, wherein if in a certain operating point range, an adaptation requirement was already stored and an adaptation requirement is ascertained anew for this operating point or operating point range, the already stored adaptation requirement is compared to the newly ascertained adaptation requirement and is replaced by an adaptation requirement that is determined based on a result of the comparison.

7. The method of claim 1, wherein an average value of the stored adaptation requirement values is ascertained, and the average value is assessed as the actually existing lambda offset.

8. The method of claim 7, wherein an operating point, at which an actually existing lambda offset results in an adaptation requirement that differs from the average adaptation requirement, is not taken into account when forming the average value.

9. The method of claim 7, wherein local deviations from the average value are assessed as inaccuracies of the system model.

10. The method of claim 1, wherein the adaptation occurs on multiple adaptation paths, a correction of the pilot control of a first control loop occurring via a first adaptation path, a modeled fill level of the catalytic converter, which is calculated by the pilot control using a catalytic converter model that is inverse with respect the catalytic converter model, being adapted via the first adaptation path to a real fill level of the catalytic converter, and the fill level being ascertained from a signal of the output-side exhaust-gas probe.

11. The method of claim 10, wherein the fill level calculated using the catalytic converter model is adapted to the real fill level via a second adaptation path, the real fill level being ascertained from a signal of the output-side exhaust-gas probe.

12. The method of claim 11, wherein the adaptation of the fill level calculated using the catalytic converter model to the real fill level occurs together with an adaptation of the fill level calculated by the pilot control using the inverse catalytic converter model to the real fill level, the discontinuously occurring adaptation processes being based on large and small signal values of the output-side exhaust-gas probe, a range of large signal values being separated from a range of small signal values by a range of medium signal values between the large signal values and the small signal values.

13. The method of claim 10, wherein the adaptation is respectively performed discontinuously.

14. A control apparatus for controlling a fill level of an exhaust gas component store of a catalytic converter of an internal combustion engine, comprising:
- a control unit to control the fill level by using a system model, which includes a catalytic converter model, and in which uncertainties of measurement or model variables, which influence the control of the fill level, are corrected by an adaptation that is based on signals of an exhaust-gas probe situated on the output side of the catalytic converter;
- wherein the control unit is configured to learn an adaptation requirement in an operating point-dependent manner, to store the learned adaptation requirement in an operating point-dependent manner and to differentiate between different causes of the uncertainties based on the operating point dependence.

15. The control unit of claim 14, wherein an adaptation requirement is ascertained using a multi-step process.

16. The control unit of claim 15, wherein a distinction is made between a lambda offset of an upstream exhaust-gas probe and inaccuracies of the system model.

17. The control unit of claim 14, wherein an adaptation requirement is respectively learned and stored separately for a specific operating point or a specific class of operating points.

18. The control unit of claim 14, wherein an operating point is defined by indicating a rotational speed and a load variable of the internal combustion engine.

19. The control unit of claim 14, wherein if in a certain operating point range, an adaptation requirement was already stored and an adaptation requirement is ascertained anew for this operating point or operating point range, the already stored adaptation requirement is compared to the newly ascertained adaptation requirement and is replaced by an adaptation requirement that is determined based on a result of the comparison.

20. The control unit of claim 14, wherein an average value of the stored adaptation requirement values is ascertained, and the average value is assessed as the actually existing lambda offset.

* * * * *